United States Patent [19]

Ahl, Jr.

[11] Patent Number: 4,587,526

[45] Date of Patent: May 6, 1986

[54] LATCHING MECHANISM FOR DEPLOYABLE/RE-STOWABLE COLUMNS USEFUL IN SATELLITE CONSTRUCTION

[75] Inventor: Elvin L. Ahl, Jr., Yorktown, Va.

[73] Assignee: The United States of America as represented by the Administrator of the National Aeronautics and Space Administration, Washington, D.C.

[21] Appl. No.: 606,431

[22] Filed: May 2, 1984

[51] Int. Cl.⁴ .............................................. H01Q 1/28
[52] U.S. Cl. ............................. 343/883; 343/DIG. 2; 52/110
[58] Field of Search ................ 343/883, 901, DIG. 2; 244/173; 52/110; 292/113

[56] References Cited

U.S. PATENT DOCUMENTS

| | | | |
|---|---|---|---|
| 3,278,212 | 10/1966 | Kolb | 287/99 |
| 3,541,566 | 11/1970 | Reibsamen | 343/882 |
| 3,688,455 | 9/1972 | Zebuhr | 52/115 |
| 4,053,177 | 10/1977 | Stammreich et al. | 292/113 |
| 4,062,156 | 12/1977 | Roth | 343/883 |
| 4,176,360 | 11/1979 | Leavy et al. | 343/883 |
| 4,183,490 | 1/1980 | Montanarini | 248/291 |
| 4,212,015 | 7/1980 | Graf et al. | 343/901 |
| 4,254,423 | 3/1981 | Reinhard | 343/883 |
| 4,354,193 | 10/1982 | Werner | 343/882 |

Primary Examiner—Eli Lieberman
Attorney, Agent, or Firm—Howard J. Osborn; John R. Manning; Wallace J. Nelson

[57] ABSTRACT

A column longeron latch assembly 72 provides the securing mechanism for the deployable, telescoping column 12 of a hoop/column antenna 10. Column 12 is an open lattice structure with three longerons disposed 120° apart as the principle load bearing member and is deployed from a pair of eleven nested bays 22, 23 (FIG. 2) disposed on opposite sides of a center section 21 under the influence of a motor-cable-pulley system (FIGS. 3 and 4). Longeron latch 72 is a four bar linkage mechanism using the over-center principle for automatically locking the longeron sections into position during deployment and serves to unlock the sections when antenna 10 is to be re-stowed. A spring pack 61 disposed in an end of each longeron serves to absorb stress forces on the deployed column through the cam head piston and abutting latch from an adjacent longeron.

19 Claims, 8 Drawing Figures

LATCHING MECHANISM FOR DEPLOYABLE/RE-STOWABLE COLUMNS USEFUL IN SATELLITE CONSTRUCTION

ORIGIN OF THE INVENTION

The invention described herein was made by an employee of the U.S. Government and may be manufactured and used by the Government for governmental purposes without the payment of any royalties thereon or therefor.

BACKGROUND OF THE INVENTION

This invention relates generally to deployable telescoping column structures employed in proposed Hoop-Column antennas and relates in particular to a latch securing mechanism for such columns.

In the continuous exploration and utilization of the spatial environment of Earth, the need for improved large structures is ever increasing. The size of orbital space structures is, at present, limited to the cargo volume of the National Aeronautics and Space Administration's Space Shuttle Vehicle. This vehicle has demonstrated the feasibility and practicality of transporting various payloads for deployment into spatial orbits about Earth. It has previously been demonstrated that folded, compressed, rolled and inflatable payloads may be compactly packaged for transport and expanded when placed in Earth orbit. This procedure has proved especially effective for weather and communication satellites, antennas and the like. Large volume structures which can be collapsed for storage and transport in relatively small volume and subsequently deployed at the site of use to envelop large volume and/or form planar, curved and contoured surfaces appear to have valuable future use in space, on Earth and/or on other planets.

Future spacecraft such as the hoop/column antenna are being designed as candidate Shuttle Transport System (STS) cargo. Antenna of this type are contemplated to be as large as 122 meters (400 feet) in diameter with the electronic feed system suspended on an 85 meter (279 foot) column when deployed. The antenna will be transported and stored within the STS cargo bay, deployed while the STS is in orbit and then re-stowed for STS transport back to Earth. One problem that has existed in previous deployment/re-stowing column or truss structures has been the inability of the structures to retain rigidity during operation while retaining re-stowing capability when it is desired to retrieve the structure for subsequent transport back to the original site.

Accordingly, it is an object of the present invention to provide an improved sequentially locking mechanism for telescoping column sections during column extension and reverse unlocking during column re-stowing.

Another object of the present invention is an improved securing mechanism for deployable telescoping column sections.

A further object of the present invention is an improved stress absorber and alignment system for the latching mechanism employed in deployable telescoping column sections.

An additional object of the present invention is an improved over-center latch for securing/releasing telescoping segments in a deployable/re-stowable column structure.

According to the present invention, the foregoing and additional objects are obtained by providing an improved column longeron latch as the securing mechanism for the deployable, telescoping column of the hoop-column antenna. The column is an open lattice, triangular structure with three longerons serving as the principal load bearing members and is divided into telescoping bays that are deployed after the antenna is placed in Earth orbit. The column longeron latch is a four-bar linkage mechanism using the over-center principle for automatically locking the longeron bays into position as deployed and serving to unlock the bays for re-stowing the antenna. The relative movement of the deploying longerons is under the influence of a cable-pulley-servo motor system with retrieval and re-stowing of the telescoped parts obtained by the same servo-motor pulling on a single cable threaded through the center of each column half and attached to the end column sections. The servo-motor is located within a center section of the column and the telescoping bays extend from opposite sides of this center section. In the illustrated embodiment, eleven internally nested telescoping bays are disposed on each of two opposite sides of the center section to give a total of twenty-three sections in the deployed column. Each nested bay or section of the column includes three longerons spaced 120° apart, six diagonals and nine peripheral battens three of which are connected to each end and three intermediate of the longerons. A column longeron latch is located on each of the longerons to give a total of sixty-six latches for the entire column length. An opposite end housing of each longeron is provided with a cam-surface piston head to engage a rotatable bearing on the latch mechanism for the adjacent longeron. This piston is spring supported by a series of belleville spring washers that serve to absorb asymmetric load stress applied to the column.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein.

DETAILED DESCRIPTION OF THE INVENTION

Figure 1:
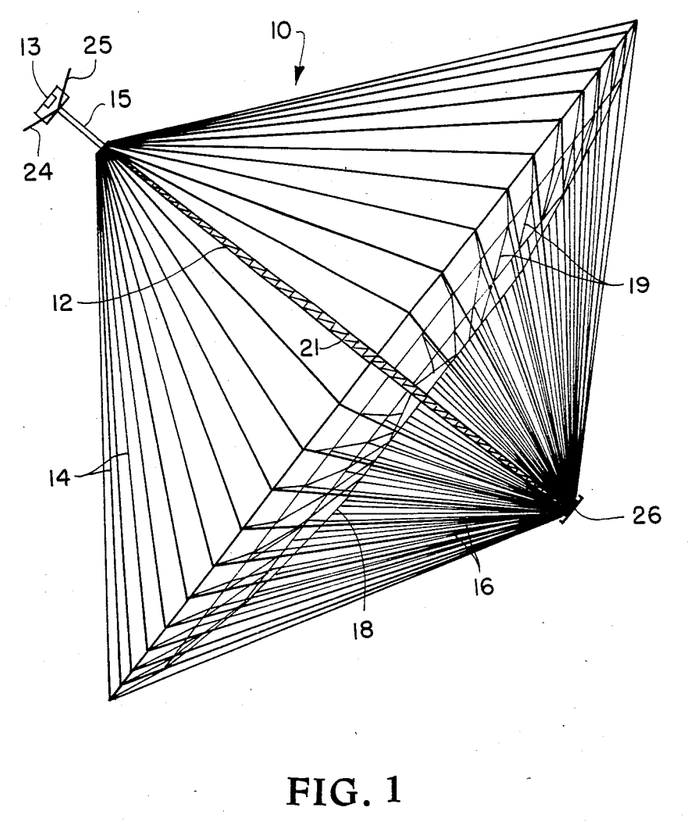
FIG. 1 is a view of a deployed hoop/column antenna system utilizing the latching system according to the present invention.

Referring now more particularly to FIG. 1, there is shown a hoop/column antenna system generally designated by reference numeral 10 and incorporating therein lattice column structure 12 of the present invention. Antenna 10 includes an electronic feed mechanism 13 and solar panels 24,25 supported by an astromast 15. Wire cables 14 are secured to one end of column 12 and connect to similar multiple cables 16 extending from the other end of column 12 at substantially the midpoint of column 12. A reflective wire mesh dish 18 is also supported by the connected cables and is circumferentially disposed about column 12 with the periphery thereof forming the "hoop" portion of hoop/column assembly 10. Suitable rib cables 19 serve to assist cables 14 and 16 in maintaining reflective surface dish 18 in the deployed configuration shown in FIG. 1.

Figure 2:
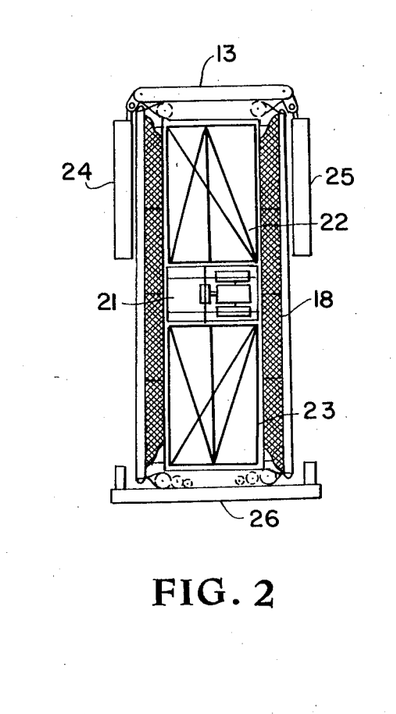
FIG. 2 is a view of the hoop/column antenna shown in FIG. 1 in the pre-deployed or stowed mode with parts thereof omitted in the interest of clarity.

Referring now more particularly to FIG. 2, the hoop/column antenna of FIG. 1 is illustrated in the pre-deployed or stowed configuration with parts thereof omitted for clarity. As shown therein column or mast 12 includes a center section 21 and a plurality of nested column bays 22,23 disposed, one nest each, on two sides of center section 21. The reflective mesh dish 18 is secured to hub center section 21 adjacent nested bays 23 but is not illustrated in detail and cables 14,16 are not visible in this Fig. The reflective dish 18 and support cables 14,16 attached to various column bays are compactly folded and disposed about the column 12 when in the pre-deployed or stowed mode illustrated in FIG. 2. The electronic feed mechanism 13 including folded solar panels 24,25 and astromast 15 are secured to the innermost bay of nested group 22 and are deployed simultaneously therewith. Stowing cannister end 26 is secured to the innermost bay of nested group 23 and is deployed simultaneously therewith.

Figure 3:
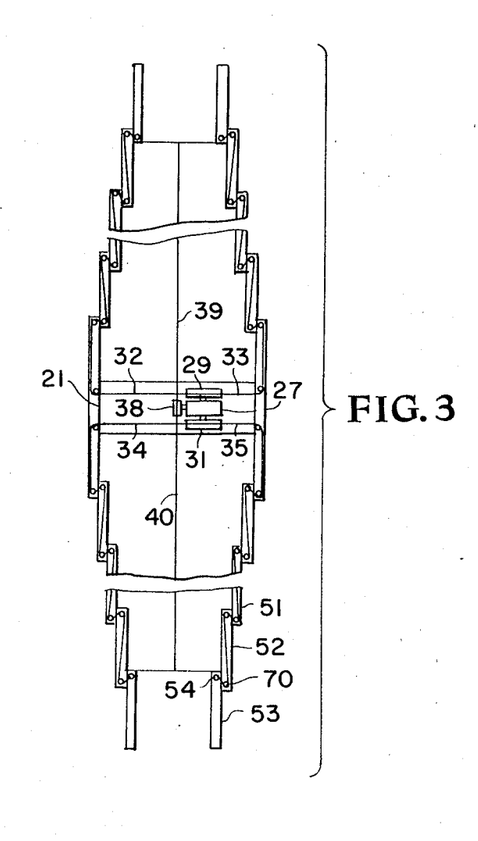
FIG. 3 is a part schematic view illustrating the pulley-cable-servo-motor system for deploying the telescoping sections and showing the deployed mode of the column.
Figure 4:
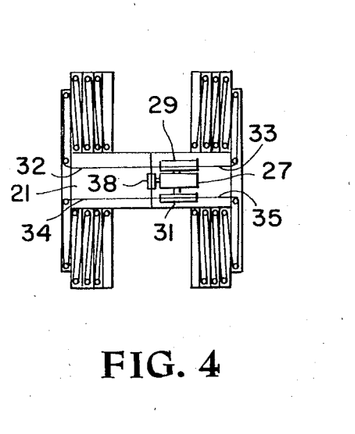
FIG. 4 is a part schematic view of the deploying/re-stowing system shown in FIG. 3 and illustrating the column in the stowed or re-stowed mode.

Referring now to FIGS. 3 and 4 the deployment and re-stowing of column 12 are controlled by a drive motor 27 disposed within center section 21. The deployment cables-pulley mechanism illustrated (for clarity) shows only two cables leading from each of drums 29,31 but it is to be understood that three such cables are employed, one for each longeron in the triangular group. Each drum 29,31 is divided into three integral spools for receiving the respective cables. That is, drum 29 receives cables 32,33 and one not illustrated, while drum 31 receives cables 34,35 and one not illustrated. A separate drum 38 is also selectively driven by motor 27 and serves to control and receive re-stowing cables 39,40 thereon. Drum 38 is divided into two separate integral spools and when activated serves to wind cables 39,40 therearound for re-stowing column 12. Cables 39,40 are threaded through the center of each of the column bays and attached to the respective end column segment thereof.

Figure 5:
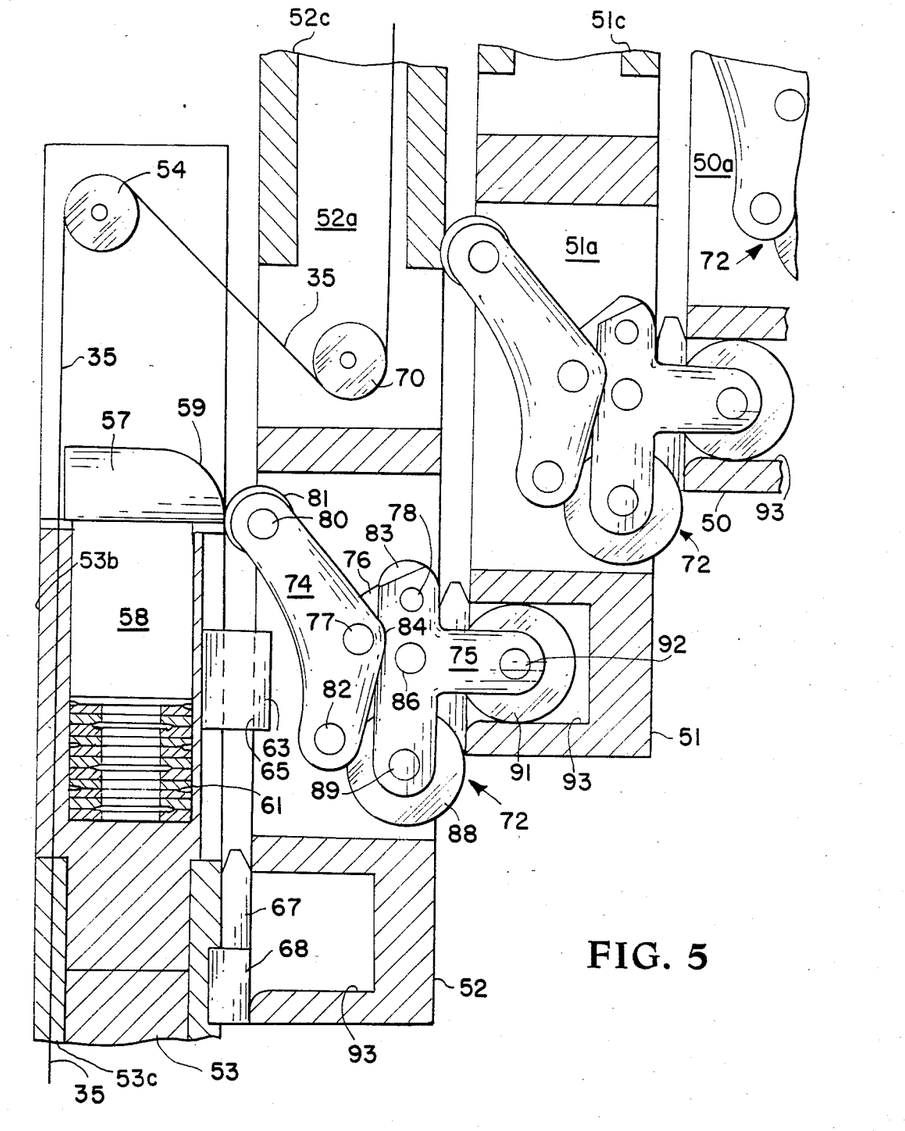
FIG. 5 is a part sectional view of one set of nested longerons and latches wherein one longeron is partially deployed.

Referring now more particularly to FIG. 5, the longeron deployment/re-stowable latch system will now be described. In this FIG., one partial set of longeron assemblies are shown and it is to be remembered that each of the three triangularly disposed longeron assemblies in each bay of column 12 are of identical construction. As shown in FIG. 5, parts of the longeron assemblies 50, 51, 52 and 53 are shown. In this illustration, longeron assembly 53 has been deployed to the position thereof shown in FIG. 3, while longeron assembly 52 is ready to be deployed and longeron assemblies 50 and 51 are in the undeployed or stowed mode. Each longeron assembly includes a cylindrical longeron 53c, 52c, 51c, etc., constituting the major length thereof, a latch housing end and a piston housing end. The latch housing end and piston housing end are square in section and are suitably bonded within opposite end cavities formed in each longeron. Latch housings 50a, 51a, and 52a, for respective longeron assemblies 50, 51 and 52 are illustrated in FIG. 5 while only piston housing end 53b for longeron assembly 53 is illustrated in this FIG. The end of longeron assembly 53 illustrated is identical to the opposite ends of illustrated longeron assemblies 52, 51 and 50 and includes pulley 54 for receiving deployment cable 35 and a spring loaded stress absorber piston 57. The shank 58 of piston 57 is disposed within a tubular or hollow portion of piston end housing 53b of longeron assembly 53 and rests against a stack of belleville spring elements 61. The head of piston 57 is provided with a sloping or cam surface 59 facing the adjacent longeron assembly 52, as will be further explained hereinafter. A bifurcated flange (one side of which is shown and designated by reference numeral 63) having a pair of through openings 65 (and one not shown) therein is integral with the piston end housing 53b of longeron assembly 53 and serves to receive a pair of guide pins 67 (and one not shown) formed on a similar bifurcated flange 68 that is integral with the terminus of latch housing 52a on adjacent longeron assembly 52.

The latch housing end 52a of longeron 52 also includes deployment pulley 70 for receiving cable 35 and a longeron latching mechanism generally designated by reference numeral 72. An identical latch 72 is disposed in each of the longerons as shown for latch housings 51a and 50a of longeron assemblies 51 and 50. Latches 72 include a restraining link 74, an actuating link 75 and a locking link 76 serving as the connection therebetween via pins 77,78. Restraining link 74 is formed of a pair of identical elbow or "boomerang" shaped rigid plates connected and maintained in spaced adjacency by solid locking link 76 and its pin connector 77, an axle pin 80 and a pivot pin 82 that also serves as the pivot connection of restraining link 74 to latch end housing 52a. A roller bearing 81 is rotatable supported on axle pin 80 between the exterior plates of restraining link 74 as will be further explained hereinafter.

Actuating link 75 is formed of a pair of rigid plates having an unbalanced or modified T-configuration. The short top end of the "T" is connected to locking link 76 via pin connector 78 and a flat area 83 is machined on this end to provide positive engagement with restraining links 74 when latch 72 is in the deployed latched mode, as will be further explained hereinafter. A portion in the top of the "T" is also machined away at an area designated by reference numeral 84 to provide for mating engagement therewith of the "elbow" portion of restraining link 74 when the latch 72 is in the undeployed or stowed mode as shown in FIG. 5. A pivot pin 86 extends through the pair of plates forming actuating link 75 and serves to pivotally connect actuating link 75 to latch end housing 52a of longeron assembly 52. The long end of the "T" top retains a bearing wheel 88 rotatably supported by axle pin 89 extending through the pair of plates forming actuating link 75. The bottom or column of the "T" also retains a bearing wheel 91 rotatably supported by axle pin 92 extending through the plates forming actuating link 75. Bearing wheel 91 is locked within the cavity of wheel housing 93 of the adjacent latch end housing 51a of longeron assembly 51 when the longerons are stowed as shown in this FIG. An identical wheel housing 93 is shown for the illustrated latch end housing 52a and 50a of longeron assemblies 52 and 50 and serve to receive identical bearing wheels from adjacent longeron latches as will be further explained hereinafter.

Figure 6A:
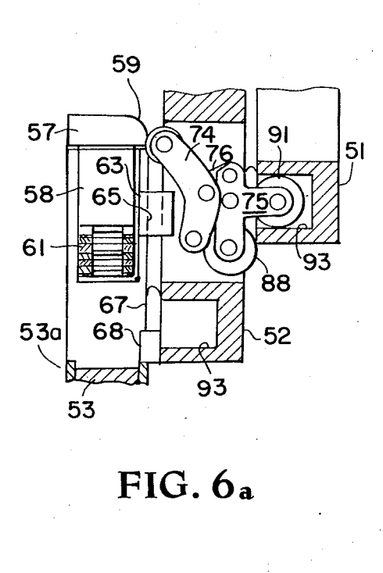
FIGS. 6a, 6b, and 6c illustrate the deployment sequence of one longeron latch according to the present invention.
Figure 6B:
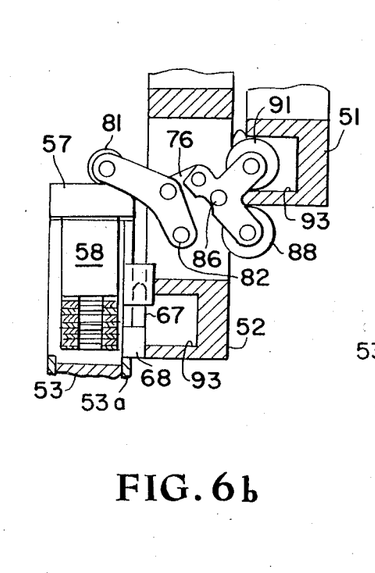
Figure 6C:
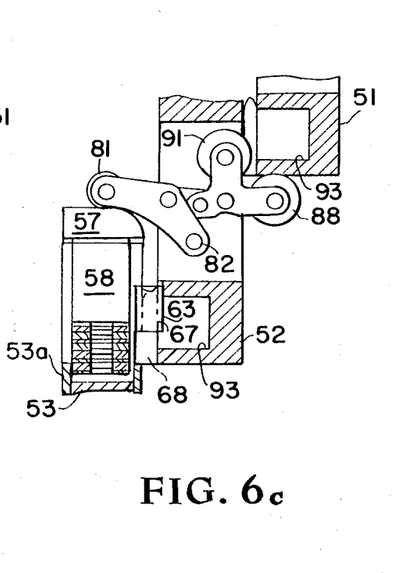

Referring now more particularly to FIGS. 6a, 6b, and 6c, the latch operation during deploying of column 12 will now be described. As discussed hereinbefore, the piston end of longeron assembly 53 illustrated is identical to one end of each of the longeron assemblies while the illustrated latch ends of longeron assemblies 52 and 51 are identical to the opposite end of each longeron assembly. In FIG. 6a, longeron assembly 53 has been deployed essentially to the position thereof shown in FIG. 3 while longeron assemblies 52 and 51 remain in the stowed nested mode. During initial deployment of longeron assembly 53 under the influence of the tension applied to cable 35, roller bearing 81 of latch 72 will rotate along the length of longeron assembly 53. When longeron assembly 53 reaches the position shown in FIG. 6a, roller bearing 81 of latch 72 will engage cam surface 59 on piston 57 and rotate thereon to the position shown in FIG. 6b. This permits restraining link 74 to rotate about pivot pin 82 and connected actuating link 75 to rotate about pivot pin 86 while the relative movement of longeron assemblies 53 and 52 also cause alignment pin 67 (and the one not shown) to engage the openings 65 (and one not shown) in flange 63. Further rotation of restraining link 74 and actuating link 75 (FIG. 6c) moves bearing wheel 91 out of housing 93 and thereby releases longeron assembly 52 for deployment. As longeron assembly 51 deploys the latched longeron assembly 53 will move therewith. Flat surface area 83 on actuating link 75 engages and bears against restraining link 74 to maintain the over-the-center latching action of longeron assemblies 53 and 52 in the position shown in FIG. 3 and FIG. 6c. Also, at this position, guide pin 67 is completely received within opening 65 and flange 68 of latch end 52a of longeron assembly 52 is in contact with flange 63 of piston end 53b of longeron assembly 53.

This positive connection of the longeron assemblies applies a substantial preload to the belleville spring packages and maintains adequate rigidity in column 12 to provide operative support for the hoop/column antenna system illustrated in FIG. 1. Any load or bending stress applied to the column is transmitted through the individual longeron linkages to the respective pistons 57 and belleville springs 61. In the event of asymmetrical loads on the column, this excessive loading and the lateral deflection is absorbed by the belleville spring package.

Referring back to FIGS. 3 and 4, for re-stowing of the deployed hoop/column antenna system, drive motor 27 is activated to pull on cables 39,40 passing through the center of the column and wind these cables on drum 38. The reverse movement of the latching sequence described in reference to FIGS. 6a, 6b, and 6c then transpires. That is, the tension on cables 32, 33, 34, 35 and the two not illustrated (FIG. 3) would be relaxed and tension applied to cables 39,40 via drum 38 to exert a pulling moment on the innermost or end deployed longeron bay in each column half. This, for example, causes bearing wheel 88 carried by the adjacent longeron assembly 52, to exert a force on longeron assembly 51 and override the latching moment of latch 72. As actuating link 75 pivots about its pivot connection 86, bearing wheel 91 re-enters housing 93 of longeron assembly 51 (FIG. 6c), restraining link 74 pivots about its pivot connection 82, the alignment pins (67 and the one not illustrated) are withdrawn from flange 63, and roller bearing 81 moves to again engage cam surface 59 on adjacent longeron assembly 53. This movement continues until bearing wheel 91 is again completely within wheel housing 93 and roller bearing 81 completely descends cam surface 59 where longeron assembly 51 becomes again locked to longeron assembly 52 (FIG. 6a) and the continued force being exerted thereon by the restraining cable 39 or 40 will cause these two longeron assemblies to move as a unit. This sequence is continued for each longeron bay until the entire column is re-stowed to the position shown in FIG. 2.

It is thus seen that the column longeron latches 72 serve to sequentially deploy (and re-stow) and secure the fully loaded telescoping bays of column 12. The individual latches 72 are designed to fit within a small area of the individual longerons and perform the latching and unlatching function using relative bay motion. The locking mechanism of the cam actuated four bar linkage mechanism of latch 72 is dependent upon the relative location of the links in the four bar linkage. The latch locking and unlocking is achieved by the relative movement of the column longerons. Spring pack 61 receives the force of latch 72 as applied to absorb the over-the-center deflection. This stress absorbing features differs from most over-center latches that rely completely on the links to absorb over-center deflection, and is deemed essential to the present invention because of the small size of the pins and linkage elements. The resulting preload of spring packs 61 and actuator links or arms 75 is set to provide a rigid column for the anticipated external loads.

The design requirements of the present invention required that the antenna column sections be sequentially locked during extension and unlocked during the re-stow operation. In a specific embodiment, each of the three longeron assemblies (50, 51, 52, etc), when deployed, must carry a compressive load of up to 1112N (250 lb). Latch 72 was designed to fit within the 19.05 mm (0.75 in) diameter longeron and the design load for the latch 72 components was taken to be 2304N (515 lb). This load was developed from the longeron compressive force of 1112N (250 lb) plus 334N (75 lb) latch margin in the locked position to allow some tolerance buildup and to provide column rigidity. The 1447N (325 lb) force on the latched mechanism and the geometry of latch 72 generates a maximum force of 2004N (450 lb) as the mechanism passes over the center point. An additional factor of 1.15 was superimposed to allow for a factor of safety resulting in the design load capability for the latch of 2305N (515 lb). The individual latch components were machined from stainless steel (17-4 PH) to accommodate the small sized package and the longerons, battens and diagonals were fabricated from 19.05 mm (0.75 in) aluminum stock.

The hoop/column antenna illustrated in FIG. 1 is designed to have a diameter of 122 meters (400 feet) with the electronic feed system 13 suspended on an 85 meter (279 feet) column. This structure is stowed, as illustrated in FIG. 2, in the cargo bay of the Space Shuttle, deployed while in Earth orbit, and then re-stowed for the Space Shuttle entry landing. The main column 12 is composed of twenty-three internally nested telescoping sections consisting of a center section 21 and a pair of eleven nested sections 22 and 23. Each of the eleven nested sections has three longerons spaced 120° from each other with a latch 72 located at one end of each longeron. Thus, there are a total of sixty-six identical latches 72 in column 12. These latches are essential to automatically lock the longeron sections into position during deployment and to also serve to unlock the sections when the antenna is to be re-stowed for Space Shuttle retrieval.

Although the invention has been described relative to a specific embodiment thereof, it is not so limited and it is to be understood that numerous variations and modifications thereof may be made without departing from the spirit and scope of the instant invention. It is therefore to be understood that within the scope of the appended claims, the invention may be practiced otherwise than as specifically described herein.

What is claimed as new and desired to be secured by Letters Patent of the United States is:

1. A latching mechanism for securing a plurality of telescoping elongated elements comprising:

each said elongated element having a first end and a second end, said first end including a piston head having a cam surface thereon tapered toward an adjacent elongated element, said piston head being integral with a piston shank and spring means disposed within said elongated element and contacting said piston shank, said second end of each said elongated element having latch means pivotally secured thereto, said latch means including a roller bearing adapted to move along the elongated surface of an adjacent elongated element during elongated element deployment and engage said cam surface on said piston head, said roller bearing being rotatably disposed between and within one end of a pair of elbow shaped plates forming a restraining link of said latch, said restraining link being pivotally connected at the other end thereof to said elongated element, a connecting link received and rotatably pinned between said pair of plates forming said restraining link intermediate said roller bearing and said end connected to said elongated element, and an actuating link formed of a pair of modified T-shaped plates with the top cross-member of the T having a long end and a short end, said connecting link being rotatably pinned connected between said pair of T-shaped plates at the short cross-bar end thereof, a pivot pin extending through the T-cross bar and serving to connect said actuating link to said elongated element, a first bearing wheel rotatably supported between said pair of T-plates at the long terminus of the cross-member, and a second bearing wheel rotatable supported between said pair of T-plates at the free end terminus of the vertical member of the T-plates.

2. The latching mechanism of claim 1 including a flat surface area formed on the short cross-bar end of said actuating link, said flat surface area serving to matingly engage and lock with an area on said restraining link when said restraining link-connecting link-actuating link combination is pivotally rotated counterclockwise from a position wherein the telescoping elongated elements are in a stowed/collapsed mode to a position wherein the telescoping elements are in a deployed/expanded mode.

3. A latching mechanism for securing adjacent elongated telescoping structural elements in both the deployed/extended and the nested stowed/collapsed mode comprising:

I. a restraining link formed of a parallel pair of elbow shaped spaced plates, (a) an axle pin extending through a first end of said parallel pair of elbow shaped spaced plates,
(b) a roller bearing supported by said axle pin and being disposed substantially within said pair of elbow shaped spaced plates with a circumferential portion thereof extending beyond said parallel pair of elbow shaped spaced plates,
(c) a pivot pin extending through the second end of said parallel pair of elbow shaped plates and serving to pivotally connect said restraining link to an area adjacent one end of one elongated telescoping structural element, II. a linear connecting link having one end thereof received and rotatably pinned between said parallel pair of elbow shaped spaced plates at the bend area thereof between said roller bearing and said second end of said plates pivotally connected to said structural element, III. an actuating link formed of a parallel pair of spaced modified T-shaped plates with the top cross-member of the T having a long end and a short end, (a) a rotatable pin connection extending through the short T top end of said parallel pair of spaced T-shaped plates and serving to rotatably pin the other end of said linear connecting link to said actuating link,
(b) a pivot pin extending through the T-top crossbar and serving to pivotally connect said actuating link to said elongated telescoping structural element,
(c) a first bearing wheel disposed between, and rotatably supported by an axle pin extending through, said parallel pair of T-plates at the long terminus of the T-top cross-bar, and
(d) a second bearing wheel disposed between and rotatably supported by an axle pin extending through the free end terminus of the vertical portion of said spaced T-shaped plates.

4. The latching mechanism of claim 3 wherein said restraining link-connecting link-actuating link combination is pivotally connected to a first end of an elongated telescoping structural element and the opposite end of said elongated structural element includes a piston having an exposed head portion and a shank portion disposed within a cavity formed in said elongated structural element, a plurality of stacked belleville springs disposed within the cavity and serving to exert a spring force on said piston shank.

5. The latching mechanism of claim 4 and including a cam surface on one side of said piston head, said cam surface adapted to facilitate contact and positioning of a roller bearing from the restraining link on an adjacent elongated telescoping structural element during deployment of the telescoped structural elements.

6. The latching mechanism of claim 3 and including a housing on the terminal end of the elongated structural element adjacent to the area thereof having the pivotally connected latch components, said housing serving to receive a second bearing wheel from an adjacent telescoped elongated element therein when the elements are in the stowed/collapsed mode and serving to release said second bearing wheel when the adjacent telescoped elongated elements are in the deployed/extended mode.

7. The latching mechanism of claim 6 and further including a bifurcated flange disposed adjacent said housing, said bifurcated flange having a pair of alignment pins extending therefrom and adapted to align with and be received by a pair of openings disposed within a similar bifurcated flange secured to an opposite end of an adjacent telescoped elongated elements when the elements are in the deployed/extended mode.

8. In combination with a deployable telescoping structural column having an open lattice structure and wherein a plurality of longerons in the structure serve as the principle load bearing members;

the column being divided into a plurality of stowed telescoping longeron bays for transport from a first site to a site of use and capable of being deployed at the site of use for utilization and re-stowed after use for transport to the first or another site, the improvement therewith comprising:

latching means for locking the stowed telescoped bays during transport from the first site to the site of use and being actuatable for sequentially unlocking the stowed bays during bay deployment and sequentially locking the bays in the deployed use mode, said latching means including a four-bar linkage mechanism using the over-center principle for automatically releasing the bays from an initial locked stowed mode for deployment and serving to automatically lock the longeron bays into position as deployed.

said latching means being further actuatable to sequentially unlock the deployed bays to permit re-stowing of the structural column for transport from the site of use to the first or another site.

9. The combination of claim 8 wherein one of said four-bar linkage mechanism is a restraining link pivotally connected to an individual end of one of the longerons in each telescoped bay, said restraining link comprising a pair of parallel elbow-shaped plates and being pivotally connected at one end thereof to the longeron, a bearing member rotatable supported in the other end of said restraining link and having a circumference thereof rotatably engaging the body of an adjacent longeron during column stowage and while the adjacent longeron is being deployed and adapted to bear against an end surface of the adjacent longeron for locking thereof in the fully deployed mode.

10. The combination of claim 9 including said end surface of the adjacent longeron against which said rotatable bearing member bears for locking the column in the fully deployed mode includes a piston housing end secured to the longeron, a stack of belleville springs disposed within said piston housing, a piston shank having one end thereof abutting said stack of belleville springs and the other end thereof forming a piston head, said piston head having a flat top surface and a cam edge surface and said rotatable bearing member rides said cam surface to said flat top surface during telescoping movement of the two adjacent longerons to a rest latch locking position on said piston head.

11. The combination of claim 10 including a latch housing integral with the longeron on an end opposite to the end thereof secured to said piston housing, a bifurcated flange integral with each said piston housing and said latch housing, one said bifurcated flange having alignment pin means integral therewith and the other of said bifurcated flanges being provided with openings therein for receiving said alignment pin means when the respective longerons of the column are in the deployed use mode.

12. The combination of claim 9 wherein another of said four-bar linkage mechanism comprises:

locking link rotatably received by and connected by one end thereof to said restraining link substantially at the elbow bend thereof, said four-bar linkage mechanism also including a modified T-shaped pair of parallel plates forming an actuating link and wherein the top or horizontal cross-member of the T forms one of the four-bar linkage mechanism and includes a long end and a short end and the vertical or base of the T forms the final one of the four-bar linkage mechanism, said locking link being rotatably received and connected to the short end of said horizontal cross-member of the T, and a pivot pin extending through the top horizontal cross-member of said T-shaped actuating link at a point substantially parallel with the vertical base of the T to serve as the pivotal connection of said actuating link with the longeron.

13. The combination of claim 12 including:

a first bearing wheel received by and rotatably connected to the long end of the T horizontal cross-member and a second bearing wheel received by and rotatable connected to the terminus of the vertical base of the T, said first and said second bearing wheels being disposed essentially 90° from each other.

14. The combination of claim 13 wherein said first bearing wheel is disposed essentially within the area of the longeron housing said actuating link during the locked stowed mode and upon longeron deployment said first bearing wheel is rotated 90° counterclockwise to a position exterior of the area of the longeron housing said actuating link and in the planar path of an adjacent longeron that is moving to or has moved to the deployed mode.

15. The combination of claim 14 wherein said second bearing wheel is maintained within a housing formed on an adjacent longeron and performs the locked function thereof during the locked stowed mode and upon longeron deployment said second bearing wheel is rotated 90° counterclockwise to retract from the adjacent longeron housing and permit deployment thereof.

16. The combination of claim 8 including one of said latching means being provided for each longeron in the structural column, a latch housing end secured to one end of each said longeron for housing said latching means, each said longeron having one said latch housing integrally attached at one end thereof, and a piston housing integrally attached to the other end of each said longeron.

17. The combination of claim 16 including a piston housed within each said piston housing, said piston having a shank portion disposed within said piston housing and a piston head integral with said shank portion and extending from said housing, a stack of belleville springs also being provided within said piston housing and abutting said piston shank, said latching means having a portion thereof adapted to engage said piston head and exert a force thereon to thereby preload said belleville springs when said latch locks the bays in the deployed use mode and said preloaded springs acting on said piston serving to absorb asymmetrical load applied to the structural column when in the deployed mode.

18. The combination of claim 17 wherein said piston head is provided with a cam edge surface and a flat top surface, said cam edge surface facing an adjacent longeron, said adjacent longeron housing said latching means that engages said piston and said latching means including a roller bearing member for movement over said piston head cam surface to exert a force on said piston head flat top surface as the telescoped bays are deployed for locking the bays in the deployed use mode.

19. The combination of claim 17 and further including a bifurcated flange integral with each said piston housing, said bifurcated housing having an opening provided through each bifurcation thereof, and a bifurcated flange integral with each said latch housing and having an alignment pin integral with each bifurcation thereof, said alignment pins serving to engage and be received by the openings in said bifurcated flange integral with said piston housing of an adjacent longeron assembly when the structural column is in the deployed use mode.

* * * * *